(12) United States Patent
Kaneko et al.

(10) Patent No.: US 8,179,762 B2
(45) Date of Patent: May 15, 2012

(54) INFORMATION PROCESSOR, OPTICAL DISC FAILURE ANALYSIS METHOD, AND COMPUTER PRODUCT

(75) Inventors: Yoshihiro Kaneko, Fussa (JP); Tooru Mamata, Akiruno (JP); Makoto Ando, Hanno (JP); Toru Hanada, Oume (JP); Hiroshi Yamazaki, Oume (JP); Hiroshi Ohno, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 4 days.

(21) Appl. No.: 12/703,581

(22) Filed: Feb. 10, 2010

(65) Prior Publication Data

US 2010/0271913 A1    Oct. 28, 2010

(30) Foreign Application Priority Data

Apr. 28, 2009 (JP) ................ 2009-109481

(51) Int. Cl.
*G11B 7/00* (2006.01)
(52) U.S. Cl. .................... 369/53.42
(58) Field of Classification Search ........... 369/30.94, 369/53.42, 53.12, 53.15, 53.2
See application file for complete search history.

(56) References Cited

U.S. PATENT DOCUMENTS

2003/0156518 A1* 8/2003 Ishizuka et al. ............ 369/53.37
2008/0123493 A1* 5/2008 Erickson et al. ........... 369/53.17

FOREIGN PATENT DOCUMENTS

| JP | 03-191421 | 8/1991 |
|---|---|---|
| JP | 04-165538 | 6/1992 |
| JP | 3947966 | 10/2003 |
| JP | 2004-062975 | 2/2004 |
| JP | 2004-127377 | 4/2004 |
| JP | 2005-063537 | 3/2005 |
| JP | 2007-080363 | 3/2007 |

OTHER PUBLICATIONS

Japanese Office Action dated Apr. 13, 2010 in Application No. 2009-109481.

* cited by examiner

*Primary Examiner* — Adam R Giesy
(74) *Attorney, Agent, or Firm* — Knobbe Martens Olsen & Bear LLP

(57) ABSTRACT

According to one embodiment, an information processor includes an optical disc drive, an acquiring module, a storage module, and a determination module. The acquiring module acquires identification information that uniquely identifies an optical disc loaded in the optical disc drive based on information read from the optical disc. The storage module obtains information related to failure analysis of the optical disc contained in state information indicating reading state or writing state upon reading from or writing to the optical disc, and stores the information related to failure analysis in association with the identification information. The determination module calculates values each indicating a level of failure of the optical disc based on pieces of information related to failure analysis of the optical disc stored until just recently in association with the identification information and, when the values satisfy a predetermined condition, determines that there is a risk of failure in the optical disc.

8 Claims, 4 Drawing Sheets

| MEDIUM ID | LOG 1 | LOG 2 | ... |
|---|---|---|---|
| XXXXX | OBTAINED INFORMATION I11 (COMMAND AND INFORMATION RELATED TO MEDIUM FAILURE) | OBTAINED INFORMATION I12 | ... |
| YYYYY | OBTAINED INFORMATION I21 | OBTAINED INFORMATION I22 | ... |
| ⋮ | ⋮ | ⋮ | ⋮ |

121b

INFORMATION PROCESSOR, OPTICAL DISC FAILURE ANALYSIS METHOD, AND COMPUTER PRODUCT

CROSS-REFERENCE TO RELATED APPLICATIONS

This application is based upon and claims the benefit of priority from Japanese Patent Application No. 2009-109481, filed Apr. 28, 2009, the entire contents of which are incorporated herein by reference.

BACKGROUND

1. Field

One embodiment of the invention relates to an information processor, an optical disc failure analysis method, and a computer product.

2. Description of the Related Art

Information processors such as personal computers (PCs) are often provided with an optical disc drive (ODD) to read data from/write data to an optical disc including a compact disc (CD) and a digital versatile disc (DVD). Due to the warp of an optical disc (medium) or the like, failure may sometimes occur in reading/writing of the ODD. If such a reading/writing failure occurs, the reading/writing need to be performed again. This results in extra processing time, and thereby reduces the convenience for the user. Accordingly, in the information processor with ODD, it is analyzed whether an optical disc causes a reading/writing failure.

Japanese Patent Application Publication (KOKAI) No. 2004-127377 discloses a known conventional technology related to optical disc failure analysis. With the conventional technology, an eccentric amount of an optical disc viewed from an optical pick-up is recognized, and a recognition result is output based on the eccentric amount.

According to the conventional technology, optical disc failure is analyzed based on a current eccentric amount of the optical disc without taking into account the previous record or logs of eccentric amounts. Therefore, highly accurate failure analysis cannot be made.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Figure 1:
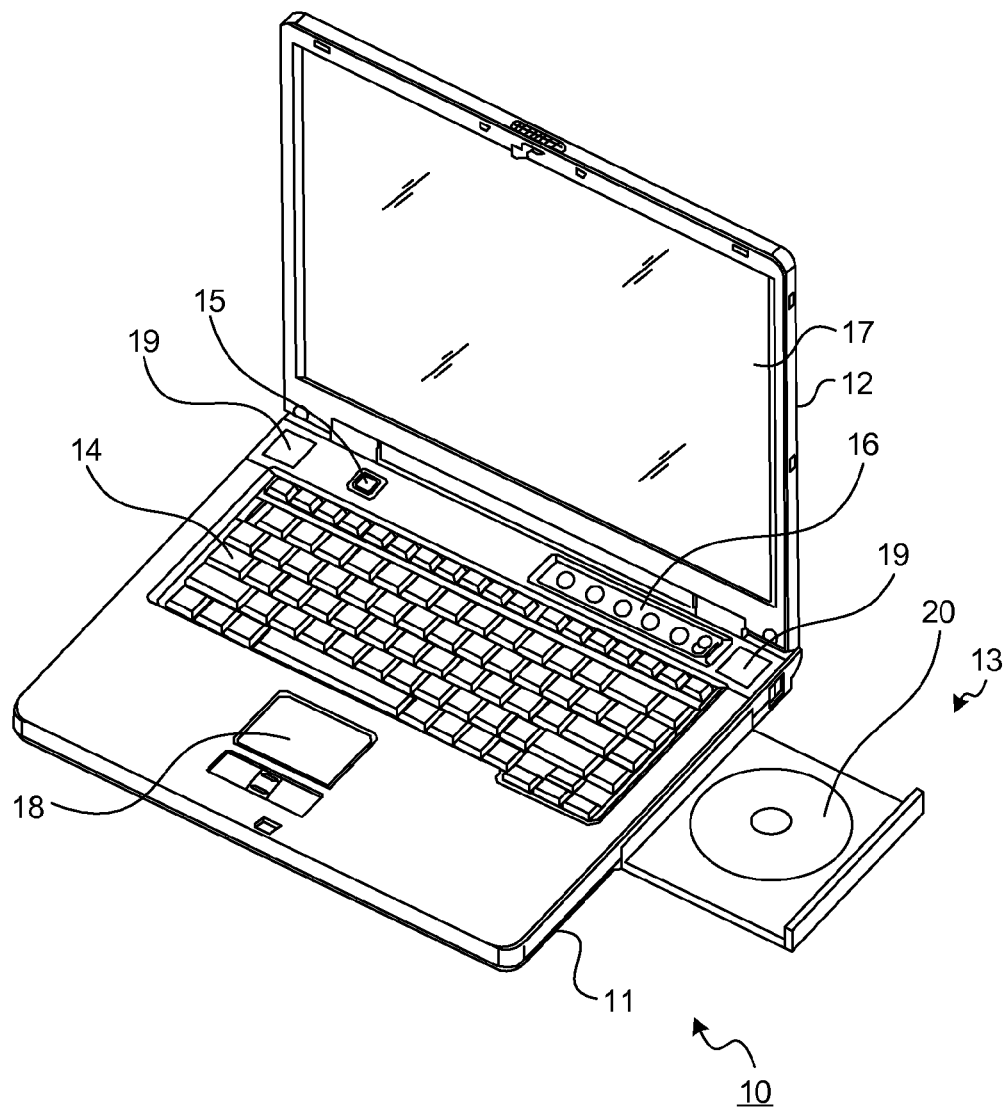
FIG. 1 is an exemplary perspective view of an information processor according to an embodiment of the invention.

Various embodiments according to the invention will be described hereinafter with reference to the accompanying drawings. In general, according to one embodiment of the invention, an information processor comprises an optical disc drive, an acquiring module, a storage module, and a determination module. The acquiring module is configured to acquire identification information that uniquely identifies an optical disc loaded in the optical disc drive based on information read from the optical disc. The storage module is configured to obtain information related to failure analysis of the optical disc contained in state information indicating reading state or writing state upon reading from or writing to the optical disc, and store the information related to failure analysis in association with the identification information. The determination module is configured to calculate values each indicating a level of failure of the optical disc based on pieces of information related to failure analysis of the optical disc stored until just recently in association with the identification information and, when the values satisfy a predetermined condition, determine that there is a risk of failure in the optical disc.

According to another embodiment of the invention, there is provided an optical disc failure analysis method applied to an information processor comprising an optical disc drive. The optical disc failure analysis method comprising: an acquiring module acquiring identification information that uniquely identifies an optical disc loaded in the optical disc drive based on information read from the optical disc; a storage module obtaining information related to failure analysis of the optical disc contained in state information indicating reading state or writing state upon reading from or writing to the optical disc, and storing the information related to failure analysis in association with the identification information; and a determination module calculating values each indicating a level of failure of the optical disc based on pieces of information related to failure analysis of the optical disc stored until just recently in association with the identification information and, when the values satisfy a predetermined condition, determining that there is a risk of failure in the optical disc.

According to still another embodiment of the invention, there is provided a computer program product embodied on a computer-readable medium and comprising code that implements the above method.

An embodiment of the invention will be set forth in detail with reference to the drawings, in which like reference numerals refer to like elements throughout, and a redundant description will not be provided.

With reference to FIG. 1, a description will be given of an information processor according to the embodiment. FIG. 1 is a perspective view of an information processor 10 according to the embodiment.

As illustrated in FIG. 1, the information processor 10 is a notebook personal computer (PC). Although the information processor 10 is described by way of example as a notebook PC in the embodiment, it is not so limited and may be any device provided with an optical disc drive (ODD). The information processor 10 may be, for example, a desktop PC. Similarly, the detailed configuration of the information processor 10 is not limited to the example described below. For example, buses that connect between elements are not limited to those described below.

The information processor 10 comprises a main body 11 and a display module 12. Embedded in the display module 12 is a display device comprising a liquid crystal display (LCD) 17. The display screen of the LCD 17 is located substantially the center of the display module 12.

The display module 12 is rotatably supported on the main body 11. This allows the display module 12 to rotate between a closed position and an open position with respect to the main body 11. The main body 11 comprises a housing formed in a flat box shape. An ODD 13 is arranged on the right side surface of the main body 11. Further, arranged on the upper surface of the main body 11 are input devices and a speaker 19. The input devices include a keyboard 14, a power button 15 to turn on/off the information processor 10, an input operation panel 16 that receives various types of instructions or inputs, and a touchpad 18 as a pointing device.

The ODD 13 enables the reading/writing of data from/to an optical disc 20 on the disc tray. More specifically, the ODD 13 loads the optical disc 20 placed on the disc tray into inside the main body 11, and reads data from or write data to the optical disc 20 through a reader/writer (described later) provided in the main body 11. Examples of the optical disc 20 include, but are not limited to, compact disc read-only memory (CD-ROM), compact disc-rewritable (CD-RW), CD+RW, and digital versatile disc read only memory (DVD-ROM).

The input operation panel 16 inputs in the system an event corresponding to a button pressed by the user. The input operation panel 16 is provided with a plurality of buttons that activate a plurality of functions, respectively. These buttons of the input operation panel 16 include, for example, a load/eject button to instruct the ODD 13 to load or eject the disc tray. In the information processor 10, the optical disc 20 placed on the disc tray is loaded/ejected in response to the depression of the load/eject button on the input operation panel 16.

Figure 2:
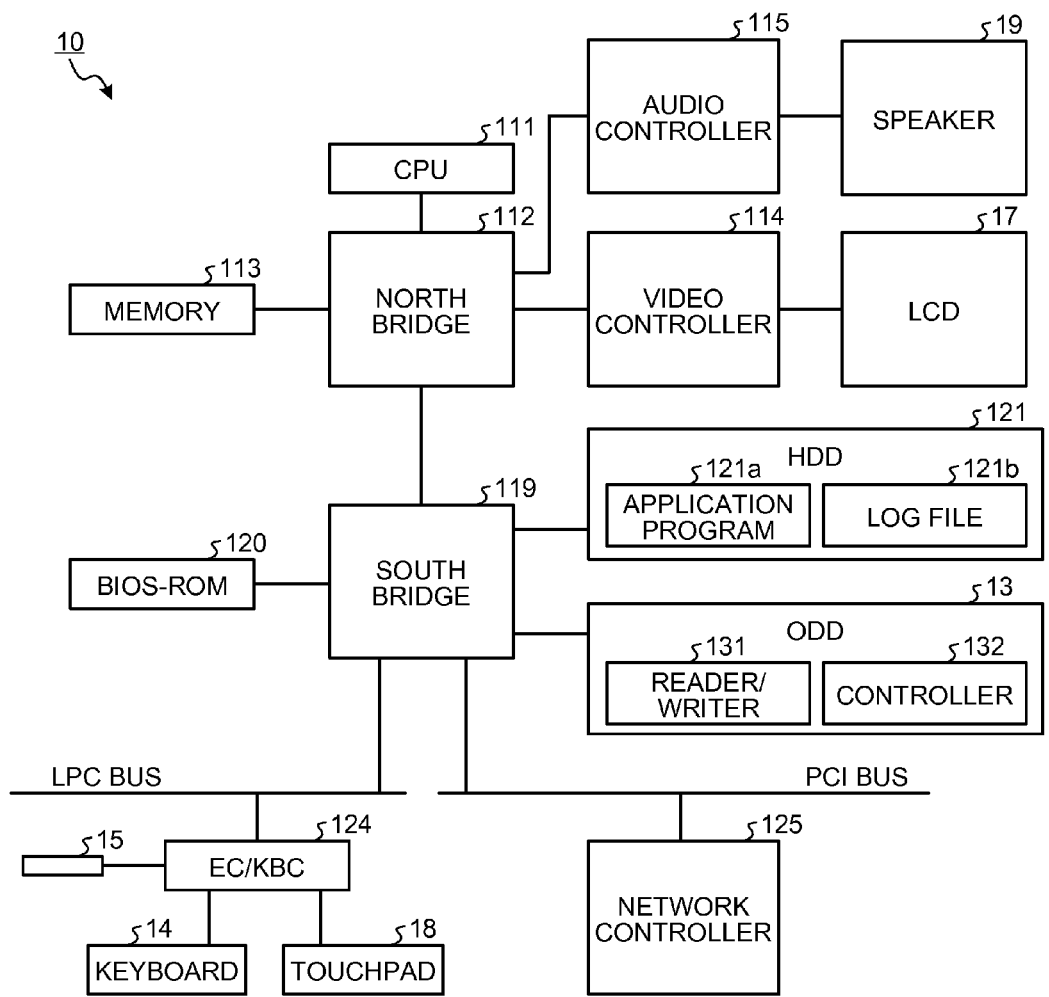
FIG. 2 is an exemplary block diagram of a system configuration of the information processor in the embodiment.

With reference to FIG. 2, a description will then be given of the system configuration of the information processor 10. FIG. 2 is a block diagram of an example of the system configuration of the information processor 10.

As illustrated in FIG. 2, the information processor 10 comprises a central processing unit (CPU) 111, a north bridge 112, a memory 113, a video controller 114, an audio controller 115, a south bridge 119, a BIOS-ROM 120, a hard disk drive (HDD) 121, an embedded controller/keyboard controller (EC/KBC) 124, and a network controller 125. In FIG. 2, the CPU 111 is connected to each element via either or both the north bridge 112 and the south bridge 119; however, this is by way of example only. In the information processor 10, the CPU 111 may be connected to each element via a single bus.

The CPU 111 is a processor that controls the overall operation of the information processor 10. The CPU 111 executes an operating system (OS) loaded from the HDD 121 into the memory 113 and an application program 121a. When the CPU 111 executes the application program 121a, the ODD 13 at least reads data from or writes data to the optical disc 20 loaded therein.

The CPU 111 also executes a system basic input-output system (BIOS) stored in the BIOS-ROM 120. The system BIOS is a program for hardware control.

The north bridge 112 connects between a local bus of the CPU 111 and the south bridge 119. The north bridge 112 comprises a built-in memory controller that controls access to the memory 113. The north bridge 112 has the function of communicating with the video controller 114 and the audio controller 115 via an accelerated graphics port (AGP) bus or the like.

The memory 113 is a volatile memory and provides a work area where the CPU 111 executes the application program 121a. The video controller 114 is a video reproduction controller that controls the LCD 17 used as a display monitor of the information processor 10. The audio controller 115 is an audio reproduction controller that controls the speaker 19.

The south bridge 119 controls each device on a peripheral component interconnect (PCI) bus as well as a low pin count (LPC) bus. The south bridge 119 comprises a built-in controllers such as integrated drive electronics (IDE) and an advanced technology attachment packet interface (ATAPI) to control the ODD 13 and the HDD 121 as a storage device that stores various types of software and data. Besides, the south bridge 119 has the function of controlling access to the BIOS-ROM 120.

The HDD 121 stores the application program 121a, a log file 121b, and various types of setting information. Incidentally, while the information processor 10 is described herein as comprising the HDD 121 as the storage device thereof, the storage device is not limited to HDD and may be, for example, a semiconductor memory.

The EC/KBC 124 is a one-chip microcomputer comprising the integration of an embedded controller (EC) for power management and a keyboard controller (KBC) for controlling the keyboard 14 and the touchpad 18. The EC/KBC 124 has the function of turning on/off the information processor 10 in response to user's operation on the power button 15. The network controller 125 is a communication device that communicates with an external network such as the Internet.

The ODD 13 comprises a reader/writer 131 and a controller 132. The reader/writer 131 comprises an optical system (an optical pickup, etc.) for reading/writing the optical disc 20, a spindle motor for rotating the optical disc 20, and a driver for driving the optical system such as a voice coil (none of them illustrated). The reader/writer 131 reads data from or write data to a predetermined sector on the optical disc 20 under the control of the controller 132. More specifically, the reader/writer 131 controls focus and track servo of the optical pickup through the driver with respect to the optical disc 20 being rotated by the spindle motor to move the optical pickup to move the optical pickup to a predetermined track, thereby reading data from or writing data to a predetermined sector in the track.

The controller 132 controls the operation of the ODD 13 according to a control signal (for example, ATAPI command) issued under the control of the CPU 111. More specifically, the controller 132 controls load/eject of the optical disc tray and the operation of the reader/writer 131 to read data from or write data to the optical disc 20 loaded on the disc tray.

The controller 132 comprises a volatile memory and a nonvolatile memory (both not illustrated). The nonvolatile memory stores information unique to the machine such as vendor information, model number, and firmware revision. Meanwhile, the volatile memory stores the operating state of the ODD 13 while the ODD 13 is operating according to a control signal as state information. The controller 132 updates the state information stored in the volatile memory based on the operation of the ODD 13 according to a control signal. Examples of the state information include information related to reading and writing (the rotation time of the spindle motor, the number of times the spindle motor has been turned on and off, seek time, etc.), and information on the malfunction (failure) of the optical disc 20.

The failure of the optical disc 20 indicates herein a failure that result in an error or malfunction in reading/writing by the ODD 13 such as, for example, warping of the optical disc 20 due to aging degradation. The failure of the optical disc 20 is stored as the state information of the ODD 13. The information on the failure of the optical disc 20 includes double-speed down information, eccentricity information, and gravity center eccentricity information.

The double-speed down information indicates that reading/writing at double speed is slowed down to regular speed, and includes, for example, the number of times the double-speed down occurs during read or write operation. The double-speed down occurs when the focus and track servo is unstable under the control of the controller 132. Accordingly, if the double-speed down occurs frequently, it means that there is a failure in the optical disc 20 such as warping of the optical disc 20.

The eccentricity information indicates that the center of tracks and the rotation center are eccentric. Examples of the eccentricity information includes measurement count indicating the number of times the eccentricity has been measured and detection count indicating the number of times the eccentricity has been detected with respect to the measurement count. The gravity center eccentricity information indicates that the gravity center of the optical disc 20 is eccentric (eccentric gravity center) with respect to the rotation center. Examples of the gravity center eccentricity information includes measurement count indicating the number of times the eccentric gravity center has been measured and detection count indicating the number of times the eccentric gravity center has been detected with respect to the measurement count.

In the measurement of the eccentricity and the eccentric gravity center, values indicating the eccentricity and the eccentric gravity center, respectively, are calculated based on the displacement of the optical pickup in the case where the optical pickup is moved to a predetermined track when the focus and track servo is unstable under the control of the controller 132. If the values each exceed a predetermined threshold, it is determined that the eccentricity and the eccentric gravity center are detected. Accordingly, if the measurement count and the detection count are large, it means that there is a failure in the optical disc 20.

That is, the double-speed down information, the eccentricity information, and the gravity center eccentricity information are failure determination information involved in determining the failure of the optical disc 20. While, in the embodiment, the double-speed down information, the eccentricity information, and the gravity center eccentricity information are cited as the failure determination information, the failure determination information is not so limited. Any information may be used as the failure determination information if enabling determination on the failure of the optical disc 20 from the operation state at the time of reading data from/writing data to the optical disc 20.

The controller 132 notifies the CPU 111 of the information stored in the volatile memory and the nonvolatile memory according to a control signal issued under the control of the CPU 111. In other words, the CPU 111 can obtain information on the failure of the optical disc 20 by, for example, an ATAPI command.

The CPU 111 stores the information on the failure of the optical disc 20 in the log file 121*b* with respect to each medium ID unique to an optical disc. The medium ID is a uniquely assigned ID based on content protection for recordable media (CPRM) and is identification information that identifies each optical disc. If the optical disc 20 stores no ID as CPRM, a specific optical disc may be identified based on the data length of a predetermined file stored in the optical disc 20 and the like, and a medium ID may be uniquely assigned to the identified optical disc. In this case, optical discs that store predetermined files of the same data length, respectively, are recognized as the same media.

When the optical disc 20 is loaded by the ODD 13, the CPU 111 reads the burst cutting area (BCA) of the optical disc 20 to obtain the medium ID. The CPU 111 then stores a command that instructs to read data from/write data to the loaded optical disc 20 and information on the failure of the optical disc 20 obtained from the ODD 13 after the operation in response to the command in the log file 121*b* as a log in a time series manner with respect to each medium ID.

Figures 3, 4:
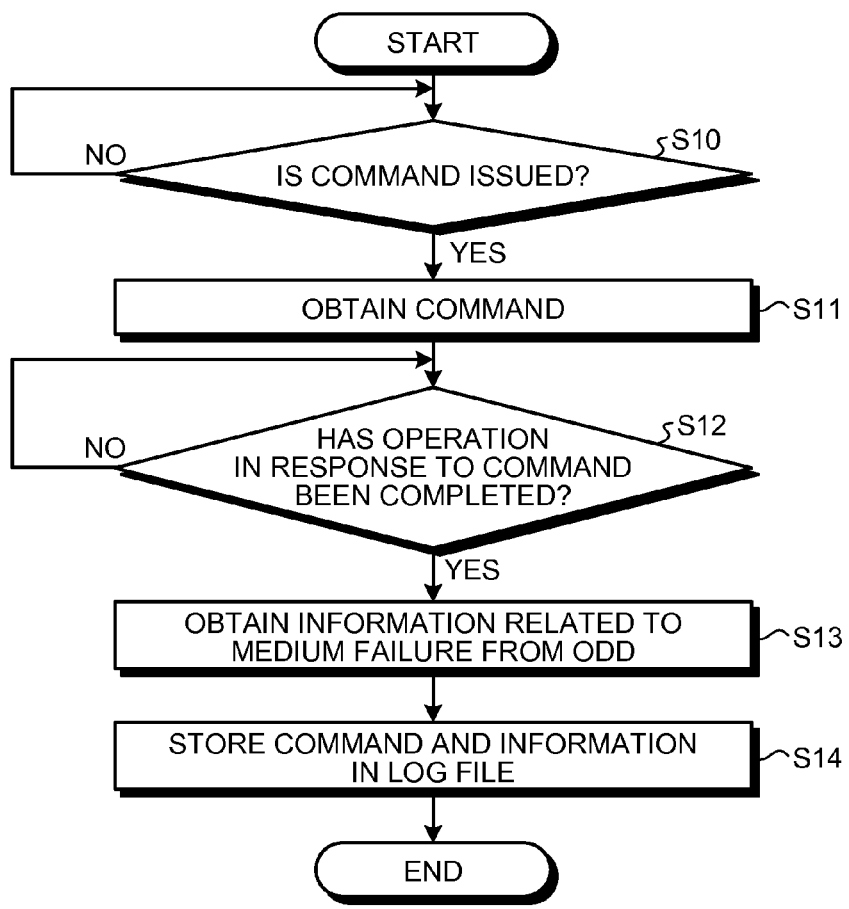
FIG. 3 is an exemplary schematic diagram of a log file in the embodiment.
FIG. 4 is an exemplary flowchart of a log file storage process performed by the information processor in the embodiment.

FIG. 3 illustrates an example of the log file 121*b*. As illustrated in FIG. 3, the log file 121*b* stores pieces of obtained information I11 to I22 including a command related to read/write operation and information related to medium failure obtained after the operation in response to the command with respect to each medium ID ("XXXXX", "YYYYY", . . . ). In the log file 121*b*, log 1, log 2, . . . are stored in time series. That is, for example, as for an optical disc with the medium ID "XXXXX", pieces of the obtained information I11, I12, . . . are stored in time series up to the most recent information. By reading the obtained information I11, I12, . . . , failure analysis can be conducted taking into account past logs up to the most recent one.

The CPU 111 executes the application program 121*a* to store the information on the failure of the optical disc 20 in the log file 121*b*. This log file storage process will be described with reference to FIG. 4. FIG. 4 is a flowchart of an example of the log file storage process.

As illustrated in FIG. 4, first, the CPU 111 determines whether a command related to reading/writing is issued to the ODD 13 (S10). If such a command is not issued (No at S10), the CPU 111 is on standby for processing. If such a command is issued (Yes at S10), the CPU 111 obtains the issued command (S11). As specific examples of the command may be cited a command to read data from a predetermined sector, a command to write data to a predetermined sector, and the like.

Thereafter, the CPU 111 determines whether the ODD 13 has completed read or write operation in response to the command (S12). If the operation has not been completed (No at S12), the CPU 111 is on standby for processing. On the other hand, if the operation has been completed (Yes at S12), the CPU 111 outputs a control signal such as an ATTPI command to the ODD 13, and obtains information related to medium failure from the ODD 13 (S13). That is, at S13, the CPU 111 can obtain information related to medium failure at the time of read or write operation in response to an issued command.

The CPU 111 then stores the issued command and the information related to medium failure obtained after the operation in response to the command in the log file 121*b* as a log corresponding to a medium ID read upon loading (S14). More specifically, the issued command, the double-speed down information, the eccentricity information, and the gravity center eccentricity information are stored in the log file 121*b* as a log with respect to the medium ID.

Figure 5:
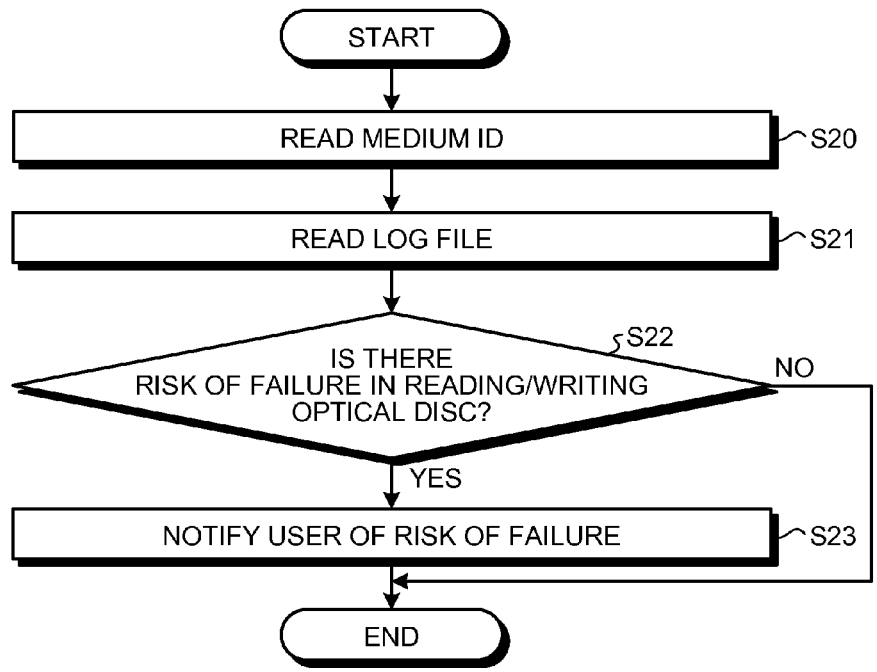
FIG. 5 is an exemplary flowchart of a failure analysis process performed by the information processor in the embodiment.
Figure 6:
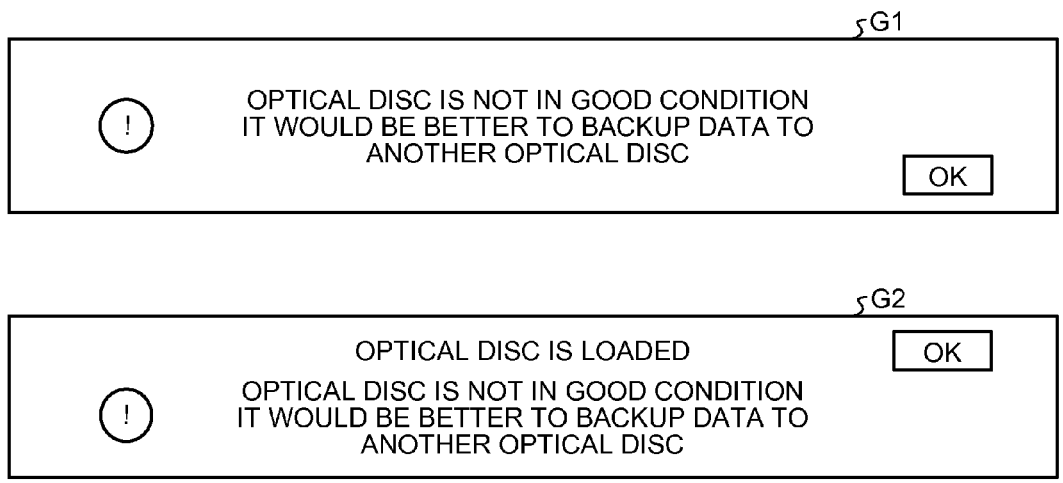
FIG. 6 is an exemplary schematic diagram of notification screen images on the information processor in the embodiment.

After that, the CPU 111 executes the application program 121*a* to analyze the failure of an optical disc and, if there is a failure in the optical disc, notifies the user of the failure. This failure analysis process will be described with reference to FIGS. 5 and 6. FIG. 5 is a flowchart of an example of the failure analysis process. FIG. 6 is a schematic diagram of notification screen images G1 and G2 displayed on the LCD 17 when an optical disc has a failure.

As illustrated in FIG. 5, first, the CPU 111 reads a medium ID from an optical disc loaded in the ODD 13 (S20), and reads logs corresponding to the medium ID from the application program 121*a* (S21).

The CPU 111 determines whether there is a risk of failure in reading data from/writing data to the optical disc loaded in the ODD 13 based on the logs read from the application program 121*a* (S22).

More specifically, upon determination at S22, the CPU 111 calculates a value indicating the level of medium failure (a value indicating a failure level) from the information related to medium failure with respect to each of logs previously stored up to the most recent one for the optical disc loaded in the ODD 13. Incidentally, the value indicating the level of medium failure may be calculated based on the double-speed down information indicating the number of times the double-speed down occurs, the eccentricity information and the gravity center eccentricity information each indicating the measurement count and the detection count (for example, the sum of them), and may be larger as the number of occurrences, the measurement count, and the detection count are larger. If the average of calculated values exceeds a predetermined threshold, the CPU 111 determines that there is a risk of failure in reading/writing the optical disc.

With this, the information processor 10 can conduct highly accurate failure analysis taking into account past logs up to the most recent one in addition to information related to current medium failure. In addition, since the average of values with respect to the past to the most recent logs is calculated, it is possible to prevent erroneous determination due to accidental failure other than the aging degradation of an optical disc.

At S22, The CPU 111 may refer to commands in the logs read from the application program 121a to determine whether there is a risk of failure in reading data from/writing data to the optical disc based on the commands, i.e., from the past to the most recent commands, and information related to medium failure at the time of executing the commands. In this case, it is possible to analyze medium failure with respect to each of the commands.

More specifically, values each indicating the level of medium failure are calculated from information related to medium failure upon executing the same predetermined command such as blank/format command. If the average of the calculated values exceeds a predetermined threshold, the CPU 111 determines that there is a risk of failure in reading data from/writing data to the optical disc. In this case, an optical disc loaded in the ODD 13 may be determined as a medium that is not suitable for executing the same predetermined command. Specifically, if the same predetermined command is a write command such as a blank/format command, the optical disc may be determined as a medium that is not suitable to be written on. Meanwhile, if the same predetermined command is a read command, it may be determined that the optical disc is a medium that is not suitable to be read, and backup is required.

Besides, values each indicating the level of medium failure may be calculated from information related to medium failure upon executing a command to read data from or write data to the same sector. If the average of the calculated values exceeds a predetermined threshold, the CPU 111 may determine that there is a risk of failure in reading data from/writing data to the optical disc. Generally, when an optical disc has warped due to the aging degradation, read or write operation with respect to a predetermined sector is likely to fail. Accordingly, if medium failure is analyzed by calculating the average of values each indicating the level of medium failure upon executing a command to read data from or write data to the same sector, more accurate failure analysis can be achieved.

Having determined that there is a risk of failure (Yes at S22), the CPU 111 notifies the user of the risk of failure in the optical disc loaded in the ODD 13 (S23). Specifically, the CPU 111 reads a notification screen image indicating that there is a risk of medium failure from the setting information stored in the HDD 121 or the like, and displays the notification screen image on the LCD 17 to notify the user of the risk of failure. Apart from the display on the LCD 17, the CPU 111 may notify the user of the risk of failure by audio output from the speaker 19.

More specifically, as illustrated in FIG. 6, the CPU 111 displays the notification screen image G1 on the LCD 17 to encourage the user to backup the optical disc. The CPU 111 may perform the failure analysis process described above when an optical disc is loaded in the ODD 13, when data is read from or write to the optical disc, when the optical disc is ejected, or the like.

For example, in the case where the CPU 111 performs the failure analysis process when an optical disc is loaded in the ODD 13 and notifies the user of medium failure, as indicated by the notification screen image G2, a message of medium failure may be displayed together with a message that the optical disc has been loaded. In this manner, if the CPU 111 notifies the user of medium failure when an optical disc is loaded in the ODD 13, it is possible to encourage the user to perform backup at the point when an optical disc that needs to be backed up is loaded in the ODD 13.

While, in the embodiment, the application program 121a executed on the information processor 10 is described as being stored in advance in the HDD 121, it may be provided as being stored in advance in another storage device such as ROM. The application program 121a may also be provided as being stored in a computer-readable storage medium, such as a compact disk read-only memory (CD-ROM), a flexible disk (FD), a compact disc-recordable (CD-R), or a digital versatile disc (DVD), in an installable or executable format.

The application program 121a executed on the information processor 10 may also be stored in a computer connected via a network such as the Internet so that it can be downloaded therefrom via the network. Further, the application program 121a may be provided or distributed via a network such as the Internet.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:
1. An information processor comprising:
an optical disc drive;
an identification information receiver configured to receive identification information associated with an optical disc in the optical disc drive based on information from the optical disc;
a storage module configured to store information related to failure analysis of the optical disc in state information indicating a reading state upon reading from the optical disc or a writing state upon writing to the optical disc in association with the identification information; and
a determination module configured to calculate failure indicator values indicating levels of failure of the optical disc based on logs of the information related to failure analysis of the optical disc in association with the identification information and to determine whether the failure indicator values satisfy a predetermined condition to determine whether there is a risk of disc error, wherein the information related to failure analysis of the optical disc includes double-speed down information indicating that double speed reading or writing is slowed down.

2. The information processor of claim 1, wherein the determination module is configured to determine whether average of the failure indicator values indicating levels of failure of the optical disc exceeds a predetermined threshold, the failure indicator values being calculated based on the information related to failure analysis of the optical disc in association with the identification information.

3. The information processor of claim 1, wherein
the storage module is configured to store a command for reading from the optical disc or writing to the optical disc and information related to failure analysis of the optical disc obtained upon reading or writing in response to the command in association with the identification information, and
the determination module is configured to calculate the failure indicator values indicating levels of failure of the optical disc based on logs of the information related to failure analysis of the optical disc and corresponding to the command in association with the identification information and determine whether the failure indicator values satisfy the predetermined condition to determine whether there is a risk of disc error.

4. The information processor of claim 3, wherein
the command is a command to read data from an identical sector of the optical disc or to write data to an identical sector of the optical disc, and
the determination module is configured to calculate the failure indicator values indicating levels of failure of the optical disc based on logs of the information related to failure analysis of the optical disc upon reading data from or writing data to the identical sector in association with the identification information, and to determine whether the failure indicator values satisfy the predetermined condition to determine there is a risk of disc error.

5. The information processor of claim 1, further comprising a notification module configured to issue notification when the determination module determines that there is a risk of disc error.

6. The information processor of claim 5, wherein the notification module is configured to issue the notification when the optical disc is loaded.

7. An optical disc failure analysis method applied to an information processor comprising an optical disc drive, the method comprising:
receiving identification information associated with an optical disc in the optical disc drive based on information from the optical disc;
storing information related to failure analysis of the optical disc in state information indicating a reading state upon reading from the optical disc or a writing state upon writing to the optical disc in association with the identification information;
calculating failure indicator values indicating levels of failure of the optical disc based on logs of the information related to failure analysis of the optical disc in association with the identification information; and
determining whether the failure indicator values satisfy a predetermined condition to determine whether there is a risk of disc error, wherein
the information related to failure analysis of the optical disc includes double-speed down information indicating that double speed reading or writing is slowed down.

8. A computer program product embodied on a computer-readable medium and comprising code that, when executed on a computer comprising an optical disc drive, causes the computer to:
receive identification information associated with an optical disc in the optical disc drive based on information from the optical disc;
store information related to failure analysis of the optical disc in state information indicating a reading state upon reading from the optical disc or a writing state upon writing to the optical disc in association with the identification information;
calculate failure indicator values indicating levels of failure of the optical disc based on logs of the information related to failure analysis of the optical disc in association with the identification information; and
determine whether the failure indicator values satisfy a predetermined condition to determine whether there is a risk of disc error, wherein
the information related to failure analysis of the optical disc includes double-speed down information indicating that double speed reading or writing is slowed down.

* * * * *